INVENTORS
MARIO J. LUPERI
SANFORD J. TICK
BY ELLIOT L. TAYLOR

Edwin D. Grant

_United States Patent Office_ 3,482,397
Patented Dec. 9, 1969

3,482,397
FLEXIBLE MEMBER VARIABLE AREA INJECTOR FOR ROCKET MOTORS
Mario J. Luperi, Dover, Sanford J. Tick, Morris Plains, and Elliot L. Taylor, Whippany, N.J., assignors to Thiokol Chemical Corporation, Bristol, Pa., a corporation of Delaware
Filed Jan. 18, 1967, Ser. No. 610,126
Int. Cl. F02k 9/02; F16k 19/00
U.S. Cl. 60—39.69                                    4 Claims

ABSTRACT OF THE DISCLOSURE

Fluid injection apparatus having a hollow, expandable member disposed in a slot which is formed in the wall of a combustion chamber housing and which extends laterally from the inner surface thereof. Fluid is forced under pressure into said slot on the side of said expandable member remote from the inner surface of said combustion chamber housing, and said expandable member is selectively expanded to control the flow of said fluid between said expandable member and one or both of the side walls of said slot.

---

This invention relates to fluid injectors and more particularly to fluid injectors that can advantageously be used in rocket motors.

To control the amount of thrust produced by a rocket motor, it is convenient to force liquid propellant to a propellant injector under a relatively constant pressure (such as is obtained by use of gas-pressurized propellant storage tanks) and to control the flow rate of propellant into the combustion chamber of the rocket motor by means of a throttling mechanism associated with the propellant injector. This control of propellant flow rate has heretofore been effected by means of injectors comprising various pintle or needle valve arrangements, most of which require fine machining tolerances and which provide only a limited variation in propellant flow rate. In contrast to such prior art devices, fluid injectors in accordance with the present invention are readily manufactured and provide a wide range of fluid flow rates. Furthermore, the arrangement of the different embodiments of the invention permits fluid to be injected into a combustion chamber through a slot of any desired length, whereas conventional pintle valve injectors can inject fluid at points only. As will become evident in the following specification, preferred embodiments of the invention provide for injection of two fluids, such as a fuel and an oxidizer, into a combustion chamber or other cavity, and in some embodiments of the invention the ratio of two fluids injected thereby can be varied under operating conditions.

Accordingly, it is an object of this invention to provide improved fluid injectors.

Another object of the invention is to provide fluid injectors that are uncomplicated in construction and effective in operation.

Still another object of the invention is to provide fluid injectors capable of injecting fluid into a combustion chamber or other cavity at widely different flow rates.

An additional object of the invention is to inject fuel and oxidizer into the combustion chamber of a rocket motor through a slot formed in the wall of said combustion chamber, the rate of injection of the fuel and oxidizer being variable.

Preferred embodiments of the invention will be described with reference to the accompanying drawings, wherein.

Throughout the specification and the drawings, like numbers refer to like parts.

Figure 1:
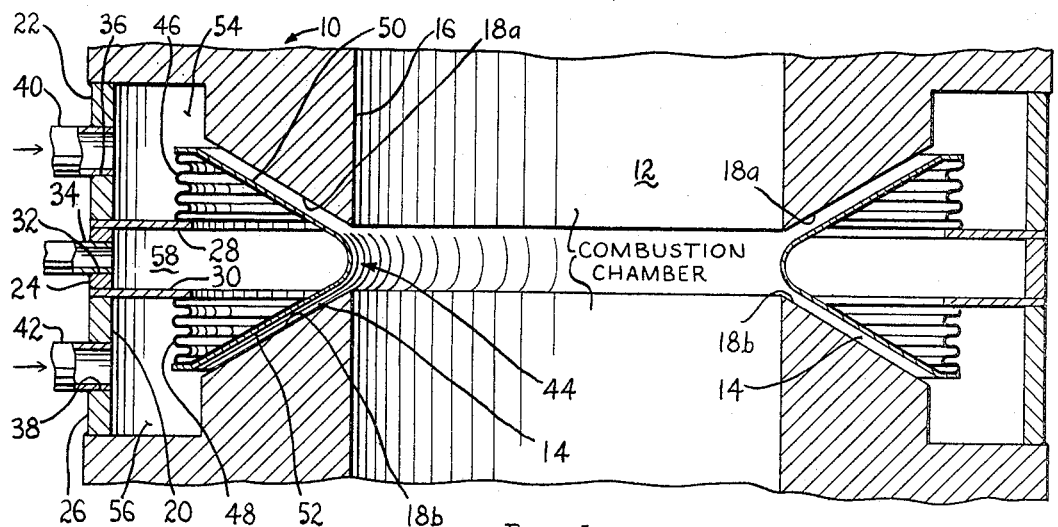
FIGURE 1 is a sectional view taken along the longitudinal axis of the combustion chamber of a rocket motor in which a first preferred embodiment of the invention is used.

In FIGURE 1 the number 10 generally designates a cylindrical housing that defines the combustion chamber 12 of a rocket motor. The wall of housing 10 is formed with a circumferential slot 14 that extends radially from the inner surface 16 thereof, the portion of said slot adjacent combustion chamber 12 having side walls 18a, 18b convergent toward the latter and the portion of said slot remote from said combustion chamber having a rectangular cross-section. It should be understood, however, that this invention is not limited with respect to the contours of slot 14 or the shape of the housing in which the slot is formed.

The bottom surface 20 of slot 14 is defined by a thin wall portion of housing 10 formed of three cylindrical sections 22, 24, 26, sections 22 and 26 being fixedly joined, as by means of welds, to the thicker wall portion of said housing and to first and second flat rings 28, 30 that extend in spaced, parallel relation from said bottom surface 20 toward the side walls 18a, 18b of said slot. Section 24 is disposed between, and fixedly joined to, rings 28, 30 adjacent their outer edges, and this section is provided with a plurality of apertures 32 (only one of which is shown) in each of which is fixedly positioned a pressure supply conduit 34. Sections 22, 26 are also provided with a plurality of apertures 36, 38 in which a plurality of conduits 40, 42 are fixedly positioned. Rings 28, 30 support an annular throttling member (generally designated by the number 44) a first side of which comprises first and second convoluted wall portions 46, 48 respectively fixedly attached to the inner edges of said rings and extending from the latter to second and third sides 50, 52. Thus rings 28, 30 divide the annular space between the first side of throttling member 44 and the bottom surface 20 of slot 14 into first and second chambers 54, 56 each of which communicates with combustion chamber 12 when the one of said second and third sides 50, 52 of said throttling member adjacent thereto is spaced from the adjacent side walls 18a, 18b of said slot. The sides 50, 52 of throttling member 44 are disposed generally parallel to the side walls 18a, 18b of slot 14, respectively, and are integrally joined at an acute angle so that the cross-section of the throttling member is triangular.

The components of the above-described embodiment of the invention can be formed of many different, well-known materials. For example, throttling member 44 can be formed of a suitable flexible metal, such as stainless steel. The flexibility of the convoluted wall portions 46, 48 and the juncture of first and second sides 50, 52 must be such that the latter can be moved toward and away from the side walls 18a, 18b respectively. In some cases, the sides 50, 52 of the throttling member can advantageously be formed with radially-extending and circumferentially-extending bosses or grooves to prevent buckling of the throttling member when its sides move relative to side walls 18a, 18b.

The interior of throttling member 44 and the space 58 between rings 28, 30 which communicates therewith are preferably filled with a suitable hydraulic fluid. A pressurizing system (such as a pump and flow control valve, not shown) for selectively varying the pressure of this hydraulic fluid is connected to conduits 34. Conduits 40 communicate with the pressurized liquid fuel supply tank of the rocket motor in which the described injection apparatus is incorporated, and conduits 42 communicate with the pressurized liquid oxidizer supply tank of the rocket motor. Thus during the operation of the rocket motor, liquid fuel is forced into chamber 54 and liquid oxidizer is forced into chamber 56 under pressure. The fluid pressure within throttling member 44 can be varied by the pressurizing means connected to conduits 34 to move second and third sides 50, 52 different distances from the side walls 18a, 18b of slot 14, respectively, thereby varying the flow rate of both fuel and oxidizer into combustion chamber 12. To terminate thrust of the rocket motor, it is only necessary to increase the fluid pressure within throttling member 44 to the point that brings the sides 50, 52 thereof into sealing engagement with the side walls 18a, 18b, respectively. As the fluid pressure within the throttling member can be precisely varied by conventional means, the described embodiment of the invention provides an effective injection assembly for controlling the flow of two propellants into the combustiton chamber of a rocket motor. Furthermore, the arrangement of the embodiment permits propellant to be injected through a slot extending completely around a cylindrical combustion chamber, whereas pintle type injectors can inject fluid into such a combustion chamber at points only.

Figure 2:
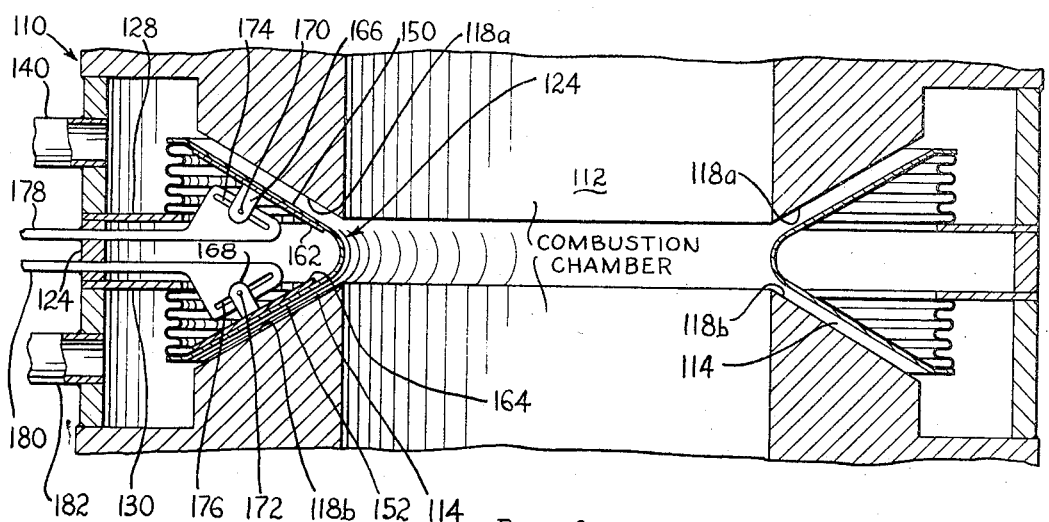
FIGURE 2 is a sectional view taken along the longitudinal axis of the combustion chamber of a rocket motor in which a second preferred embodiment of the invention is used.

FIGURE 2 illustrates a second embodiment of the invention some of the components of which are the same or substantially the same as components of the first embodiment and which are therefore designated by the same reference number preceded by 1. The main difference between the first and second embodiments is that the sides 150, 152 of the throttle member 144 of the second embodiment are moved toward and away from the side walls 118a, 118b of the slot 114 in the wall of housing 110 by mechanical means, rather than by variation in fluid pressure as in the first embodiment. More particularly, a thin, annular plate 162, 164 is attached to the inner surface of the sides 150, 152, respectively, and a lug 166, 168 fixedly projects from each of these plates. A cam follower pin 170, 172 is mounted adjacent the free end of each lug 166, 168 and is engaged within a slot 174, 176 formed in the enlarged end of a respective one of two shafts 178, 180, these shafts being slidably engaged within apertures formed in a cylindrical member 124 fixedly joined to rings 128, 130 and extending across the space therebetween. Because slots 174, 176 are inclined relative to a plane equidistant from the side walls 118a, 118b of slot 114, as shafts 178, 180 are moved toward and away from combustion chamber 112 by conventional drive means (such as hydraulic cylinders, not shown) sides 150, 152 of throttling member 144 are respectively moved toward and away from the side walls 118a, 118b of slot 114. Since the two sets of shafts 178, 180 can be moved independently, the second embodiment of the invention provides the advantage that the two liquid propellants forced under pressure through conduits 140, 142 can be injected at different ratios into combustion chamber 112.

Figure 3:
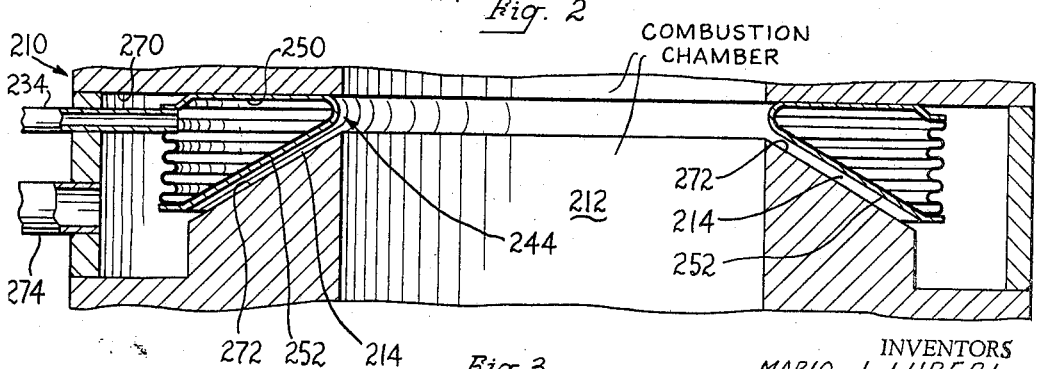
FIGURE 3 is a sectional view taken along the longitudinal axis of the combustion chamber of a rocket motor in which a third preferred embodiment of the invention is used.

FIGURE 3 illustrates a third embodiment of the invention comprising a throttling member 244 one side 250 of which is fixedly attached to one planar side wall 270 of a slot 214 in the wall of a hollow cylindrical housing 210, and a second side 252 of which is movable toward the adjacent side wall 272 of said slot. A plurality of conduits 234 (only one of which is shown) communicatively connect the interior of throttling member 244 with a pressurizing means for varying the pressure within said throttling member, whereby side 252 is selectively moved toward and away from side wall 272 to thereby vary the flow rate of propellant from conduit 274 to combustion chamber 212.

It will thus be seen that the objects set forth hereinbefore are efficiently obtained by means of the invention. It will be obvious that certain changes can be made in the described and illustrated fluid injection apparatus without departing from the concepts of the invention. For example, in certain applications of the invention, the throttling members 44, 144, 244 of the disclosed embodiments of the invention can be replaced by a throttling member in the form of a hollow, expandable toroid or cylinder. The scope of the invention is therefore to be considered as being limited only by the terms of the appended claims.

What is claimed is:
1. Fluid injection apparatus comprising:
a housing defining a combustion chamber, the wall of said housing having an annual space surrounding said chamber and a peripheral slot that extends from the inner surface of said space to said chamber interior;
a hollow, expandably and contractably flexible throttling member fixedly disposed within said slot, at least one side of said throttling member being movable toward and away from an adjacent side wall of said slot in response to expansion and contraction of said member to thereby provide a flow passage of variable cross-sectional area between said combustion chamber and the portion of said slot remote from the latter;
means for forcing a fluid to flow under pressure into said space and said slot and into said combustion chamber; and
means communicable with the interior of said member for moving said movable side thereof toward and away from said adjacent side wall of said slot, whereby flow of said fluid into said combustion chamber can be selectively varied.

2. Fluid injection apparatus comprising:
a housing defining a generally cylindrical combustion chamber, the wall of said housing having an annular space surrounding said chamber and a circumferentially extending slot between said space and said chamber interior;
a hollow, expandably and contractably flexible throttling member having a first side spaced from the outer surface of said space and two sides respectively disposed opposite the side walls of said slot and movable toward and away therefrom;
support means for fixedly connecting said first side of said throttling member to said housing;
means for forcing a fluid under pressure into said annual space, said slot and into said chamber; and
means for moving said movable sides of said throttling member toward and away from the side walls of said slot, whereby the flow of said fluid into said combustion chamber can be selectively varied.

3. Fluid injection apparatus comprising:
a housing defining a generally cylindrical combustion chamber, the wall of said housing having an annular space and a circumferentially extending slot between said space and said chamber interior;
a hollow, expandably and contractably flexible throttling member having a first side spaced from the outer surface of said space and second and third sides respectively disposed opposite the side walls of said slot and movable toward and away therefrom;
support means for fixedly connecting said first side of said throttling member to said housing, said support means dividing said annular space into first and second chambers each communicating with said combustion chamber when the one of said first and second sides of throttling member adjacent thereto is spaced from the adjacent side wall of said slot;
means for forcing first and second fluids into said first and second chambers respectively;
control means for moving said movable sides of said throttling member toward and away from the side walls of said slot, whereby the flow of said first and second fluids from said first and second chambers to said combustion chamber can be selectively varied.

4. Fluid injection apparatus as defined in claim 3, wherein:

the portions of the said walls of said slot disposed opposite said second and third sides of said throttling member are convergent toward said combustion chamber;

said support means comprises a pair of flat rings extending in spaced, parallel relation between the outer surface of said annular space and said first side of said throttling member, the space between said rings communicating with the interior of said throttling member;

said first side of said throttling member comprises first and second convoluted wall portions fixedly attached to said first and second rings respectively and extending from the latter to said second and third sides of said throttling member, said throttling member being generally triangular in cross-section so that said second and third sides thereof conform with the convergent portions of said side walls of said slot; and said control means comprises hydraulic fluid disposed within said throttling member and the space between said rings, and means for varying the fluid pressure of said hydraulic fluid.

References Cited

UNITED STATES PATENTS

| | | | |
|---|---|---|---|
| 2,810,259 | 10/1957 | Burdett | 60—39.74 |
| 3,055,957 | 9/1962 | Braconier et al. | 60—39.74 XR |
| 3,074,231 | 1/1963 | Klein | 60—39.74 |
| 3,234,731 | 2/1966 | Dermody et al. | 60—39.74 XR |
| 3,344,605 | 10/1967 | Mageean et al. | 60—39.74 XR |

JULIUS E. WEST, Primary Examiner

U.S. Cl. X.R.

60—39.74; 137—155; 239—412; 251—145